Sept. 20, 1971  G. H. JUNKER  3,605,845
SELF-LOCKING FASTENER
Filed Oct. 3, 1969  2 Sheets-Sheet 1
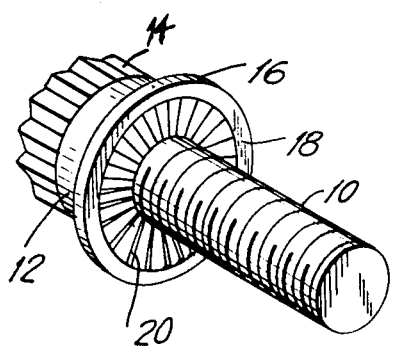
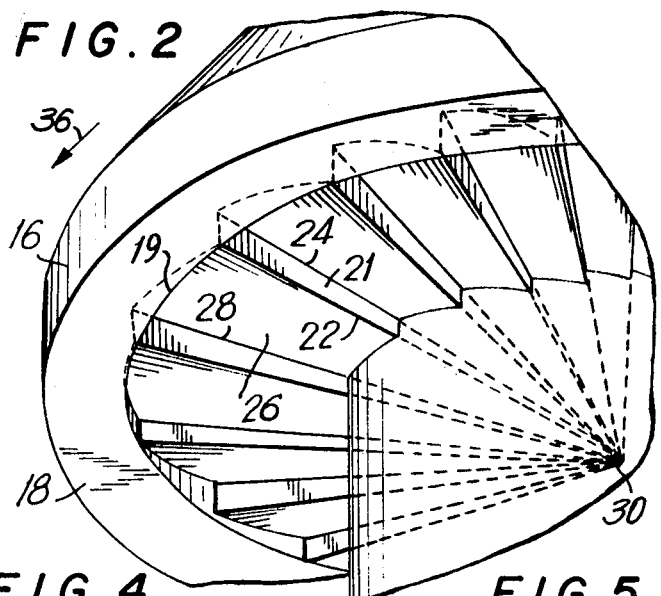
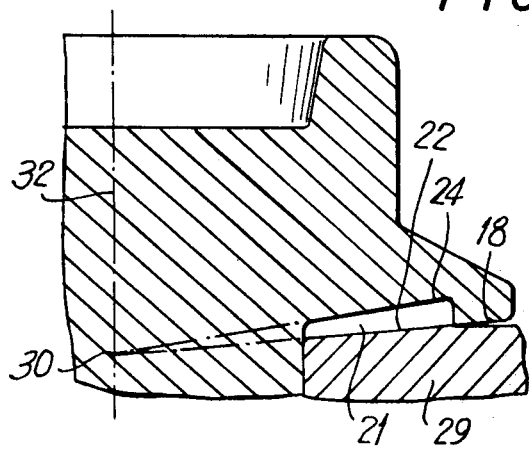
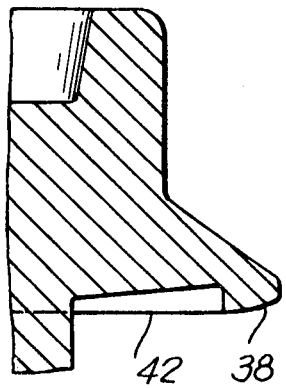
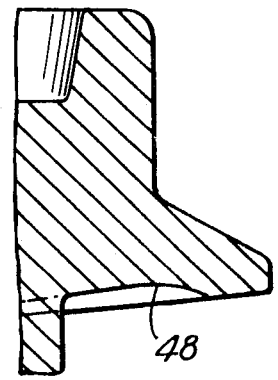
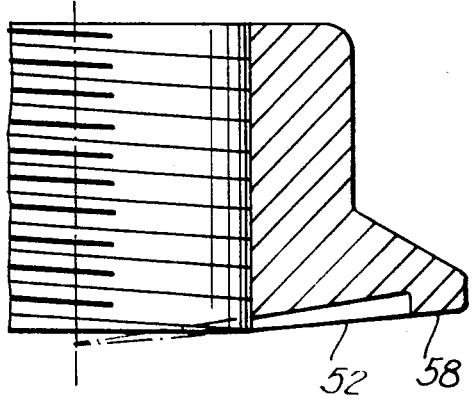
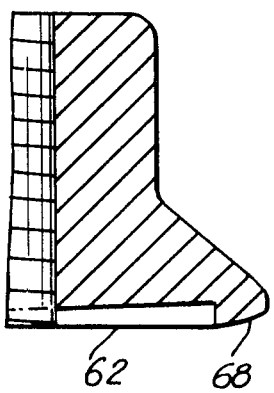
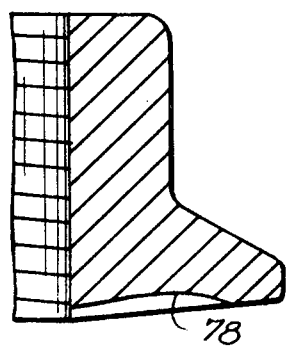
INVENTOR.
GERHARD H JUNKER
BY
Andrew L. Ney
ATTORNEY Sept. 20, 1971     G. H. JUNKER     3,605,845
SELF-LOCKING FASTENER Filed Oct. 3, 1969     2 Sheets-Sheet 2

INVENTOR.
GERHARD H. JUNKER

ATTORNEY

United States Patent Office 3,605,845
Patented Sept. 20, 1971

3,605,845
SELF-LOCKING FASTENER
Gerhard H. Junker, Bad Breisig, Germany, assignor to
Standard Pressed Steel Co., Jenkintown, Pa.
Continuation-in-part of application Ser. No. 733,663,
May 31, 1968. This application Oct. 3, 1969, Ser.
No. 868,965
Int. Cl. F16b *39/282*
U.S. Cl. 151—37          24 Claims

ABSTRACT OF THE DISCLOSURE

A self-locking fastener having a serrated bearing surface arranged to penetrate a workpiece, whereby resistance to loosening is created. The serrations in the bearing surface are located within a smooth surface, annular ring which, upon engagement with the workpiece, opposes further penetration of the serrations and controls the extent of penetration of the serrations.

---

This application is a continuation-in-part of copending application, Ser. No. 733,663, filed May 31, 1968, now abandoned.

The present invention relates to self-locking fasteners and, in particular, to bolts, nuts and the like having serrated bearing surfaces which provide resistance against the fastener becoming loosened unintentionally after it has been seated.

A serious problem in joints secured together by threaded members is the possibility of joint separation due to a nut backing-off from a bolt or a bolt backing-out from a nut or other internally threaded member. Generally, this result can occur when the joint is subjected to vibrations.

Various proposals have been suggested in the past to either eliminate or greatly reduce the unintentional loosening of threaded members. Because of the wide variety of applications in which this undesirable result can occur, many different types of locking devices have been developed. One approach has been to treat the bearing surface of the fastener in such a manner that the resistance to relative rotation between the fastener and a workpiece in which fastener is installed is greater than the resistance to relative movement between the mating threads. As a result, the resistance to rotation between the mating threaded parts no longer is the critical factor in determining whether the threaded parts will turn relative to each other. It is to this type of locking technique that the present invention is directed.

One important requirement of these fasteners is that the "off" torque (torque required to loosen a tightened fastener) be greater than the "on" torque (torque required to seat a fastener properly). This relationship should exist for several installations and removals of the fastener.

Because the bearing surfaces of these fasteners, for the most part, are serrated or are provided with teeth or the like which are arranged to dig into the workpiece to create resistance to relative rotation between the fastener and the workpiece, some damage or marring of the workpiece bearing surface will occur as these fasteners are seated and removed. Such damage to the workpiece causes it to weaken. Hence, a second important requirement of these fasteners is that the effects of marring or damage to the workpiece be minimized.

Generally, prior art fasteners provided with a locking characteristic in the bearing surface fail to satisfy concurrently these and other requirements. Those fasteners available at the present time having improved "off" torque to "on" torque ratios dig into the workpiece in such a manner or to such an extent as to weaken greatly the workpiece. "Notch" effect, the build up of stress concentrations, is a common result and may cause fatigue failure of the clamped parts. This problem becomes more acute as the thickness of the workpiece is reduced. Those fasteners available at the present time having reduced adverse effects on the workpiece provide insufficient "off" torque.

Accordingly, it is an object of the present invention to provide a new and improved self-locking fastener having a locking mechanism provided in the bearing surface of the fastener.

It is another object of the present invention to provide a self-locking fastener of this type which provides improved resistance to unintended rotation between the fastener and a workpiece and yet causes a minimum amount of marring of the workpiece surface with which it is in contact.

It is a further object of the present invention to provide a self-locking fastener which is relatively simple in construction and inexpensive to fabricate.

These objects, as well as others, are achieved according to a preferred embodiment of the present invention by providing a fastener having a bearing surface comprising an annular ring and a plurality of annularly disposed serrations within the annular ring. The serrations are in the form of teeth when viewed along a cylinder concentric with the longitudinal axis of the fastener. The annular ring is in the form of a continuous surface which, at its radially inner periphery, intersects with the radially outer ends of the crests of the teeth.

For a better understanding of the present invention, together with other and further objects thereof, reference is made to the following description, taken in connection with the accompanying drawing, and its scope will be pointed out in the appended claims.

Referring to the drawing:

FIG. 1 is a perspective view of a self-locking bolt constructed in accordance with the present invention;

FIG. 2 is a perspective view, on an enlarged scale, of a portion of the bearing surface of the bolt illustrated in FIG. 1;

FIG. 3 is a vertical section of the bolt illustrated in FIGS. 1 and 2;

FIG. 4 is a vertical section of a second embodiment of a bolt constructed in accordance with the present invention;

FIG. 5 is a vertical section of a third embodiment of a bolt constructed in accordance with the present invention;

FIG. 6 is a vertical section of a first embodiment of a nut constructed in accordance with the present invention;

FIG. 7 is a vertical section of a second embodiment of a nut constructed in accordance with the present invention;

FIG. 8 is a vertical section of a third embodiment of a nut constructed in accordance with the present invention;

Figure 9:
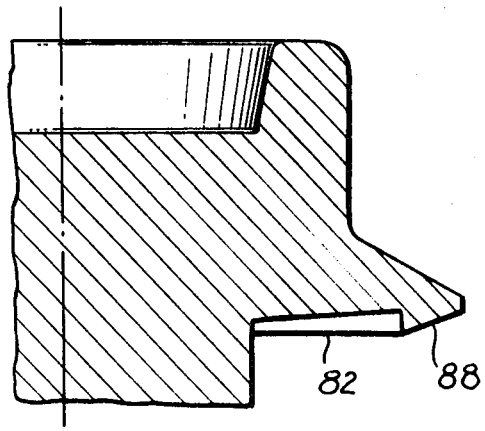
FIG. 9 is a vertical section of a fourth embodiment of bolt constructed in accordance with the present invention.

Referring to FIGS. 1, 2 and 3, a self-locking bolt constructed in accordance with the present invention includes a threaded shank 10 and a bolt head 12 at one end of shank 10. Bolt head 12 has a wrenching section 14 and a bearing flange 16.

The bearing surface of flange 16 includes an annular ring 18 and a plurality of annularly disposed serrations 20 located within ring 18. When serrations 20 are viewed along a cylinder concentric with the longitudinal axis of the bolt, they are seen to be in the form of teeth. For the particular embodiment illustrated in FIGS. 1, 2 and 3, the teeth are generally saw-tooth in shape, and each include a wall 21 extending between the crest 22 of a given tooth and the root 24 of an adjacent tooth. An inclined surface 26 extends between the crest 22 of a tooth and the root 28 of this tooth. The roots and crests of the teeth are defined by straight lines originating from a point 30 on the longitudinal axis 32 of the bolt. As a result, the width of each serration increases as the distance from the axis of the bolt increases. In addition, the height of walls 21 of each serration increase as the distance from the axis of the bolt increases.

Annular ring 18 is seen to be in the form of a continuous surface of substantial radial width. By using the term "substantial" in describing annular ring 18, applicant means a ring of finite width in contrast to a sharp edge.

The outermost ends of the crests 22 of the teeth are common to the innermost ends of lines formed by the intersection of radial planes and annular ring 18. In other words, the crests 22 lie in an imaginary surface which meets ring 18 along a circular line 19 without forming a step or wall between this imaginary surface and the annular ring. As most clearly illustrated in FIG. 3, the crests 22 lie in an imaginary surface which is a continuous, radially inward extension of the surface of annular ring 18. For the embodiment of the invention illustrated in FIGS. 1, 2 and 3, the surface of annular ring 18 contains straight-line extensions of crests 22 and, as a result, the bearing surface of flange 16 is generally conical. With the bearing surface of flange 16 so inclined relative to the longitudinal axis of the bolt, the annular ring will come into contact with a workpiece 29 only after the serrations have contacted the workpiece.

As the bolt is turned for installation in a workpiece in the direction of arrow 36 in FIG. 2 and the underside of flange 16 of the bolt bears against the workpiece, cold flow of the workpiece material takes place as the workpiece is engaged by the inclined surface of each serration. The cold flow material builds up behind each wall 21 of each serration, whereby resistance is created to rotation of the bolt in an opposite direction. The extent of penetration of serrations 20 in the workpiece is controlled accurately by annular ring 18. Upon engagement of the workpiece by ring 18, the smooth surface of ring 18 opposes further penetration of the serrations. The nature of the workpiece material determines whether the annular ring portion of the bearing surface will penetrate the workpiece and, if so, to what extent.

By locating ring 18 outside serrations 20, the penetration of the serrations may be controlled more accurately than for a ring located inside the serrations. This is due to the fact that for a given width for ring 18, the bearing area is greater as the distance from the center of the bolt becomes greater. In addition, with a bearing ring adjacent the shank of the bolt, a certain degree of bearing between this ring and the workpiece is lost since the hole in the workpiece must be slightly larger than the diameter of the shank and no matter how accurately such a hole is drilled, there is a chamfer at the edge of the hole. As a result, for a given bearing area for ring 18, the width of the ring may be decreased if it is positioned outside the serrations. This permits increasing the length of the serrations for a given flange diameter so that the resistance to the bolt backing-off is increased in comparison to a bolt having the annular ring within the serrated portion. Alternatively, the length of the serrations may be held fixed and the outside diameter of flange 16 may be reduced if the width of ring 18 is reduced. This reduces the weight and material requirements of the bolt, both of which are desired in most applications.

By locating annular ring 18 outside the serrations, another desirable effect is achieved. Because the serrations cause cold flow in the workpiece material, undesirable stress concentrations are created in the workpiece. However, with the serrations within annular ring 18, the ring is effective in "captivating" these stress concentrations and preventing them from extending beyond the area covered by flange 16. In contrast, a bolt having the annular ring within the serrations is not capable of limiting the effect of stress concentrations in the same manner. The fact that crest 22 of each serration lies in a surface which is a continuous extension of ring 18 means that even when ring 18 penetrates the workpiece the problems, if any, due to stress concentrations are minimal since the change in shape of the workpiece surface is gradual. This is illustrated in FIG. 3.

FIG. 4 shows a second embodiment of a bolt constructed in accordance with the present invention. This embodiment differs from the one previously described in that crest 42 is normal to the longitudinal axis of the bolt and annular ring 38 is a convex curve. The transition from ring 38 to crest 42 is smooth so as not to cause undesired stress concentrations.

FIG. 5 shows a third embodiment of a bolt constructed in accordance with the present invention. This embodiment differs from the others previously described in that root 48 is curved rather than being a straight line.

FIG. 9 shows a fourth embodiment of a bolt constructed in accordance with the present invention. This embodiment differs from the others previously described in that crest 82 is normal to the longitudinal axis of the bolt and annular ring 88 forms a small angle with the plane containing the crests of the teeth.

In all of the above-described embodiments, it should be apparent that the radially outermost portion of bearing surface 16 is closer axially of the bolt to the end face of bolt head 12 than the radially innermost portion of the bearing surface. Thus, in all of these embodiments, the annular ring will come into contact with the workpiece only after the serrations have contacted it.

Figure 10:
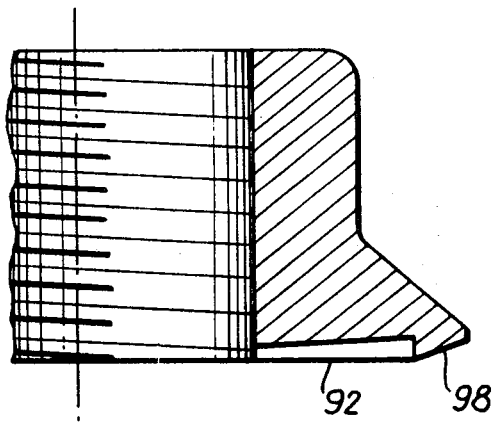
FIG. 10 is a vertical section of a fourth embodiment of a nut constructed in accordance with the present invention.

In FIGS. 6, 7, 8, and 10, there are illustrated self-locking nuts constructed in accordance with the present invention and having bearing surfaces arranged similar to the bolts illustrated in FIGS. 3, 4, 5 and 9, respectively. Since the nuts in FIGS. 6, 7, 8 and 10 function in a manner similar to the bolts in FIGS. 3, 4, 5 and 9, a detailed description of the nuts has been omitted. It will be sufficient to note that in FIG. 6, crest 52 of each tooth is a straight line lying in the plane of annular ring 58 and both are inclined relative to the longitudinal axis of the nut. In FIG. 7, crest 62 of each tooth is normal to the longitudinal axis of the nut and annular ring 68 is a convex curve. Root 78 of each tooth in FIG. 8 is curved in contrast to the straight-line roots in FIGS. 6 and 7. In FIG. 10, crest 92 is normal to the longitudinal axis of the nut and annular ring 98 forms a small angle with the radial plane containing the crests.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A self-locking fastener having a driving portion with a radial bearing surface and a free surface at the other end, the radially outermost portion of said bearing surface being closer axially of said driving portion to said free surface than is the radially innermost portion of said bearing surface, said bearing surface comprising:
   an annular ring in the form of a continuous bearing surface of substantial radial width;
   and a plurality of radially extending serrations radially inwardly of said annular ring and in the form of teeth when viewed along a cylinder concentric with the longitudinal axis of said fastener, the crests of said teeth lying in an imaginary surface which is a continuous, radially inward extension of said annular ring bearing surface.

2. A self-locking fastener according to claim 1 wherein each of said teeth include a wall extending between the crest of the tooth and the root of an adjacent tooth and an inclined surface extending between said crest of said tooth and the root of said tooth.

3. A self-locking fastened according to claim 2 wherein said roots and said crests of said teeth are defined by straight line all originating from the same point on said longitudinal axis of said fastener.

4. A self-locking fastener according to claim 3 wherein said crests of said teeth are inclined relative to said longitudinal axis of said fastener.

5. A self-locking fastener according to claim 3 wherein said crests of said teeth are normal to said longitudinal axis of said fastener and said annular ring, when viewed along a radial plane through said fastener, is a convex curve.

6. A self-locking fastener having a driving portion with a radial bearing surface and a free surface at the other end, the radially outermost portion of said bearing surface being closer axially of said driving portion to said free surface than is the radially innermost portion of said bearing surface, said bearing surface comprising an annular bearing ring of substantial radial width and a plurality of annularly disposed serrations radially inwardly of said ring in the form of teeth when viewed along a cylinder concentric with the longitudinal axis of said fastener, said annular bearing ring in the form of a continuous surface which, if extended inward toward said axis, contains the crests of said teeth.

7. A self-locking fastener according to claim 6 wherein said teeth are generally saw-tooth in shape.

8. A self-locking bolt comprising:
a threaded shank;
and a bolt head at a first end of said shank, said head having an annular bearing surface extending from said shank to the periphery of said head so that the line at which said bearing surface meets said periphery is farther axially of said bolt from the second end of said shank than is the line at which said bearing surface meets said shank, said bearing surface having an annular bearing ring and a plurality of annularly disposed serrations radially inwardly of said ring in the form of teeth when viewed along a cylinder concentric with the longitudinal axis of said bolt, said annular bearing ring in the form of a continuous surface of substantial radial width which, if extended inward toward said axis, contains the crests of said teeth.

9. A self-locking bolt according to claim 8 wherein the crests of said teeth are defined by straight lines all originating from the same point on said longitudinal axis of said bolt.

10. A self-locking bolt according to claim 9 wherein said crests and said annular ring are inclined relative to said longitudinal axis of said bolt.

11. A self-locking bolt according to claim 10 wherein the roots of said teeth are defined curved lines.

12. A self-locking nut comprising a nut body having a bearing surface at one end thereof and a free surface at the other end thereof, said bearing surface extending from the bore of said nut to the periphery of said nut so that the line at which said bearing surface meets said periphery is closer axially of said nut to said free surface than is the line at which said bearing surface meets said bore, said bearing surface having an annular bearing ring and a plurality of annularly disposed serrations radially inwardly of said ring in the form of teeth when viewed along a cylinder concentric with the longitudinal axis of said bolt, said annular bearing ring in the form of a continuous surface of substantial radial width which, if extended inward toward said axis, contains the crests of said teeth.

13. A self-locking nut according to claim 12 wherein the crests of said teeth are defined by straight lines all originating from the same point on said longitudinal axis of said nut.

14. A self-locking nut according to claim 13 wherein said crests and said annular ring are inclined relative to said longitudinal axis of said nut.

15. A self-locking nut according to claim 14 wherein the roots of said teeth are defined curved lines.

16. A self-locking fastener having a driving portion with a radial bearing surface and a free surface at the other end, the radially outermost portion of said bearing surface being closer axially of said driving portion to said free surface than is the radially innermost portion of said bearing surface, said bearing surface comprising:
an annular ring in the form of a continuous bearing surface of substantial radial width, said ring contiguous with and extending inwardly from the periphery of said fastener;
and a plurality of annularly disposed serrations radially inwardly of said annular ring and in the form of the teeth when viewed along a cylinder concentric with the longitudinal axis of said fastener, the outermost ends of the crests of said teeth being common to the innermost ends of lines formed by the intersection of radial planes and said annular rings.

17. A self-locking bolt comprising:
a threaded shank;
and a bolt head at a first end of said shank, said head having an annular bearing surface extending from said shank to the periphery of said head so that the line at which said bearing surface meets said periphery is farther axially of said bolt from the second end of said shank than is the line at which said bearing surface meets said shank, said bearing surface having an annular bearing ring and a plurality of annularly disposed serrations radially inwardly of said ring in the form of teeth when viewed along a cylinder concentric with the longitudinal axis of said bolt, said annular bearing ring in the form of a continuous bearing surface of substantial radial width contiguous with and extending inwardly from said periphery of said bolt head, the outermost ends of the crests of said teeth lying in a circle formed by the intersection of said annular bearing ring and an imaginary surface containing said crests.

18. A self-locking nut comprising a nut body having a bearing surface at one end thereof and a free surface at the other end thereof, said bearing surface extending from the bore of said nut to the periphery of said nut so that the line at which said bearing surface meets said periphery is closer axially of said nut to said free surface than is the line at which said bearing surface meets said bore, said bearing surface having an annular bearing ring and a plurality of annularly disposed serrations radially inwardly of said ring in the form of teeth when viewed along a cylinder concentric with the longitudinal axis of said bolt, said annular bearing ring in the form of a continuous bearing surface of substantial radial width contiguous with and extending inwardly from said periphery of said nut, the outermost ends of the crests of said teeth lying in a circle formed by the intersection of said annular bearing ring and an imaginary surface containing said crests.

19. A self-locking fastener having a driving portion with a radial bearing surface and a free surface at the other end, the radially outermost portion of said bearing surface being closer axially of said driving portion to said free surface than is the radially innermost portion of said bearing surface, said bearing surface comprising an annular ring of substantial radial width and a plurality of annularly disposed serrations within said ring in the form of teeth when viewed along a cylinder concentric with the longitudinal axis of said fastener, said annular ring being in the form of a continuous surface which at its radially inner periphery intersects with the radially outer ends of the crests of said teeth.

20. A self-locking fastener according to claim 19 wherein the crests of said teeth lie in a plane normal to the longitudinal axis of said fastener and wherein said annular ring is inclined at a slight angle to said plane containing the crests of said teeth.

21. A self-locking fastener according to claim 16 wherein the crests of said teeth lie in a plane normal to the longitudnal axis of said fastener and wherein said annular ring is inclined at a slight angle to said plane containing the crests of said teeth.

22. A self-locking fastener according to claim 17 wherein the crests of said teeth lie in a plane normal to the longitudinal axis of said bolt and wherein said annular ring is inclined at a slight angle to said plane containing the crests of said teeth.

23. A self-locking fastener according to claim 18 wherein the crests of said teeth lie in a plane normal to the longitudinal axis of said nut and wherein said annular ring is inclined at a slight angle to said plane containing the crests of said teeth.

24. A self-locking fastener having a driving portion with a radial bearing surface and a top free surface at the other end, said bearing surface comprising an annular ring in the form of a continuous bearing surface of substantial radial width and a plurality of radially extending serrations radially inwardly of said annular ring and in the form of teeth when viewed along a cylinder concentric with the longitudinal axis of said fastener, said annular ring being in the form of a continuous surface which at its radially inner periphery intersects with the radially outer ends of the crests of said teeth, the radially outer periphery of said annular ring being closer axially of said driving portion to said free surface than is the lowermost portion of the crests of said teeth.

References Cited

UNITED STATES PATENTS

| | | | |
|---|---|---|---|
| 1,009,801 | 11/1911 | Shinn et al. | 151—39 |
| 1,298,863 | 4/1919 | Baker | 151—37UX |
| 3,078,899 | 2/1963 | MacLean et al. | 151—37 |
| 3,255,797 | 6/1966 | Attwood | 151—37 |
| 3,370,631 | 2/1968 | James | 151—37 |
| 3,389,734 | 6/1968 | Gutshall | 151—37 |

RAMON S. BRITTS, Primary Examiner